United States Patent
Su

(10) Patent No.: US 8,864,430 B2
(45) Date of Patent: Oct. 21, 2014

(54) SCREW WITH LOW DRILLING RESISTANCE

(75) Inventor: Guo-Cai Su, Kaohsiung (TW)

(73) Assignee: Taiwan Shan Yin Int'l Co., Ltd., Kaohsiung (TW)

( * ) Notice: Subject to any disclaimer, the term of this patent is extended or adjusted under 35 U.S.C. 154(b) by 185 days.

(21) Appl. No.: 12/779,207

(22) Filed: May 13, 2010

(65) Prior Publication Data

US 2011/0280685 A1 Nov. 17, 2011

(51) Int. Cl.
*F16B 25/04* (2006.01)
*F16B 25/00* (2006.01)
*F16B 25/10* (2006.01)

(52) U.S. Cl.
CPC ........... *F16B 25/0052* (2013.01); *F16B 25/106* (2013.01); *F16B 25/0015* (2013.01)
USPC ........................................ 411/386; 411/387.4

(58) Field of Classification Search
USPC ............... 411/386–387.7, 308, 310, 311, 938
See application file for complete search history.

(56) References Cited

U.S. PATENT DOCUMENTS

| | | | | |
|---|---|---|---|---|
| 3,186,464 A | * | 6/1965 | Baumle | 411/168 |
| 3,479,921 A | * | 11/1969 | Omoto | 411/416 |
| 3,742,541 A | * | 7/1973 | Ohmoto | 470/198 |
| 7,101,134 B2 | * | 9/2006 | LeVey et al. | 411/411 |
| 2010/0061824 A1 | * | 3/2010 | Lin | 411/387.5 |

\* cited by examiner

*Primary Examiner* — Flemming Saether
(74) *Attorney, Agent, or Firm* — Rosenberg, Klein & Lee

(57) ABSTRACT

A screw with low drilling resistance comprises a head portion, a shank portion, a plurality of first threads, a drilling portion, and a plurality of second threads. Wherein, a plurality of opening slots are correspondingly defined on the second threads, and a first included angle of the first threads is smaller than a second included angle of the second threads. Thereby, the opening slots on the second threads efficiently provide the first threads with an auxiliary cutting effect and preferably offers a debris accommodating room. The first threads including the smaller first included angle favorably reinforce the bearing force of the second threads including the larger second included angle, thereby promoting the cutting effect of the screw and allowing a speedy screwing.

1 Claim, 7 Drawing Sheets

SCREW WITH LOW DRILLING RESISTANCE

BACKGROUND OF THE INVENTION

1. Field of the Invention

The present invention relates to a screw design, particularly to a screw with low drilling resistance for speeding up the drilling performance and enhancing the drilling force.

2. Description of the Related Art

Referring to FIGS. 1 to 3, a "Thread-Forming Screw Fastener" 1 disclosed in the US Publication No. 2005/0186048 comprises a head portion 11, a shank portion 12 extended from the head 11, a plurality of threads 13 spiraling on the shank 12, and a drilling portion 14 disposed on the shank 12, opposite to the head 11. Wherein, a plurality of wave troughs 131 are defined on the threads 13. Especially, a first apex angle α included by an upper flank 132 and a lower flank 133 of the threads 13 is formed between 30°~35°, and a second apex angle α' included by wave crest 135 formed on the outer thread edge 134 of the deepest region of the wave troughs 131 is contoured between 30°~58°. Further, a trough angle A is included by the wave trough 131. Accordingly, the screw 1 utilizes the concurrent drilling and cutting efficiency provided by the wave troughs 131 to reinforce the severing performance of the threads 13, thence achieving a speedy drilling and fastening effect.

However, in time of the threads 13 practically drilling into an object 2, the dimension of the trough angle A of the wave troughs 131 as well as the dimension of the first apex angle α of the threads 13 readily influences fastening effect of the screw 1 though the wave troughs 131 offer a preferable cutting function. The analysis is as follows:

1. The dimension of the trough angle A influences the fastening effect:

The dimension of the trough angle A decides the cutting function of the threads 131. That is, if the trough angle A is formed by an improperly small size, each wave trough 131 could not be guaranteed to provide the auxiliary cutting with efficiency during the threads 13 drilling into the object 2. Because the elasticity is characterized by the fibers contained in the object 2, the fibers are not able to respectively get into the small-sized wave troughs 131. Therefore, the cutting efficiency of the wave troughs 131 is limited or even the drilling of the threads 13 is in vain; thereby the screw 1 is incapable of being well-drilled into the object 2. On the other hand, if the trough angle A is formed by an improperly large size, the dimension of the threads 13 is likely to be relatively diminished. Herein, such drilling and cutting efficiency of the larger trough angle A is not as satisfied as that of the smaller trough angle A. Moreover, the smaller threads 13 having a weaker and thinner formation that adversely results in an insufficient bearing force readily collapse.

2. The first apex angle α of the threads 13 influences the fastening effect:

The first apex angle α decides the fastening effect of the screw 1. That is, if the first apex angle α is formed by an improperly small size, the threads 13 are unable to bear a large drilling torque while they confront a more rigid object, which readily breaks the threads 13. On the other hand, if the first apex angle α is formed by an improperly large size, the threads 13 merely bears a larger drilling torque but provides the cutting effect inferior to that of one with a smaller first apex angle. Thus, the utilization is adversely limited, which indeed needs amendment.

SUMMARY OF THE INVENTION

It is therefore the purpose of this invention to provide a screw with low drilling efficiency so as to enhance the cutting efficiency as well as reinforce the drilling competence, thereby achieving a speedy fastening effect.

The screw with low drilling resistance in accordance with the present invention comprises a head portion, a shank portion extended from the head, a plurality of first threads spiraling on the shank portion, and a drilling portion disposed on the shank, opposite to the head. Wherein, each first thread includes a first upper flank and a first lower flank connected to the first upper flank; a first included angle is converged by the first upper flank and the first lower flank. Characterized in that, a plurality of second threads are spiraled on the shank and are respectively disposed on the first upper flank and the first lower flank. Wherein, each second thread includes a second upper flank and a second lower flank connected to the second upper flank; a second included angle is converged by the second upper flank and the second lower flank. Concurrently, a plurality of opening slots are correspondingly defined on the second upper flank and the second lower flank. Further, the first included angle is smaller than the second included angle. Thereby, a favorably severing effect and accommodating manner could be provided. In addition to the disposition of the first threads between the second threads contributing to the reinforcement on the strength of the second threads whose second included angle is larger, the present invention achieves a low drilling resistance to speed up the fastening operation.

Preferably, a diameter of the first threads is smaller than a diameter of the second threads.

Preferably, a diameter of the first threads is equal to a diameter of the second threads.

The advantages of the present invention over the known prior art will become more apparent to those of ordinary skilled in the art upon reading the following descriptions in conjunction with the accompanying drawings.

DETAILED DESCRIPTION OF THE PREFERRED EMBODIMENTS

Figure 1:
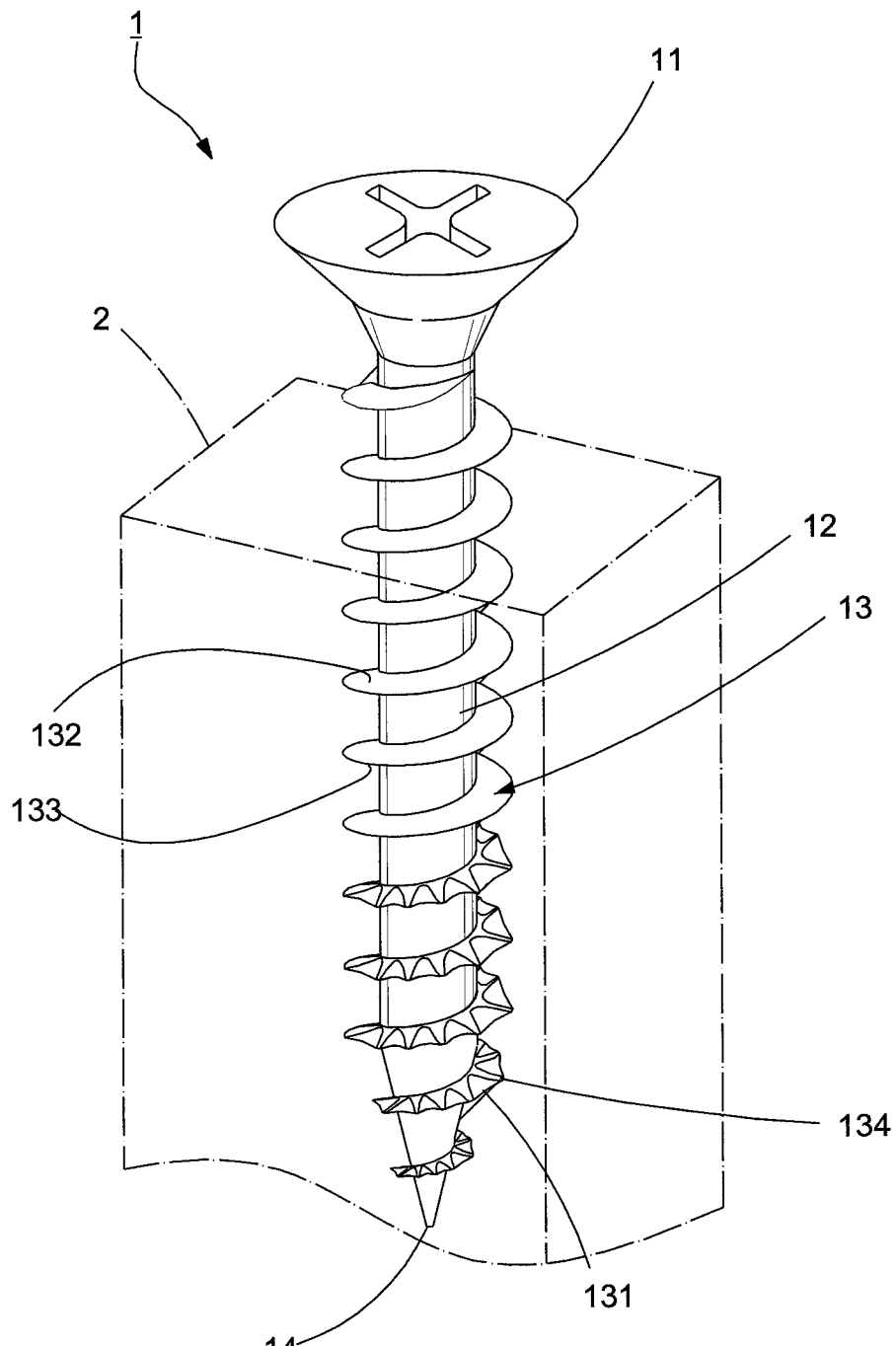
FIG. 1 is a schematic view showing a conventional screw.
Figure 2:
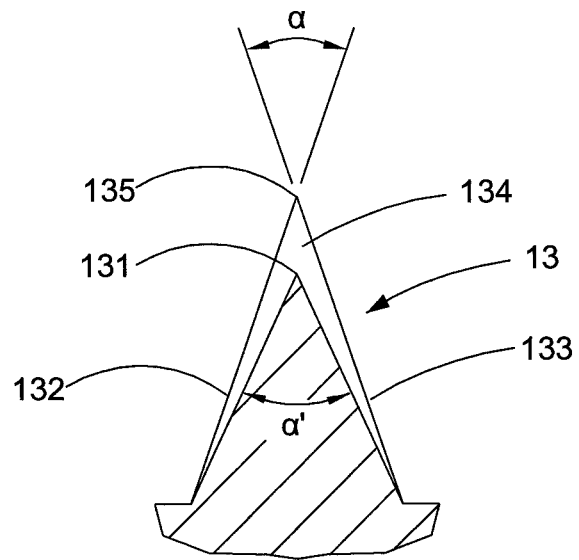
FIG. 2 is a cross-sectional view showing a thread of the conventional screw.
Figure 3:
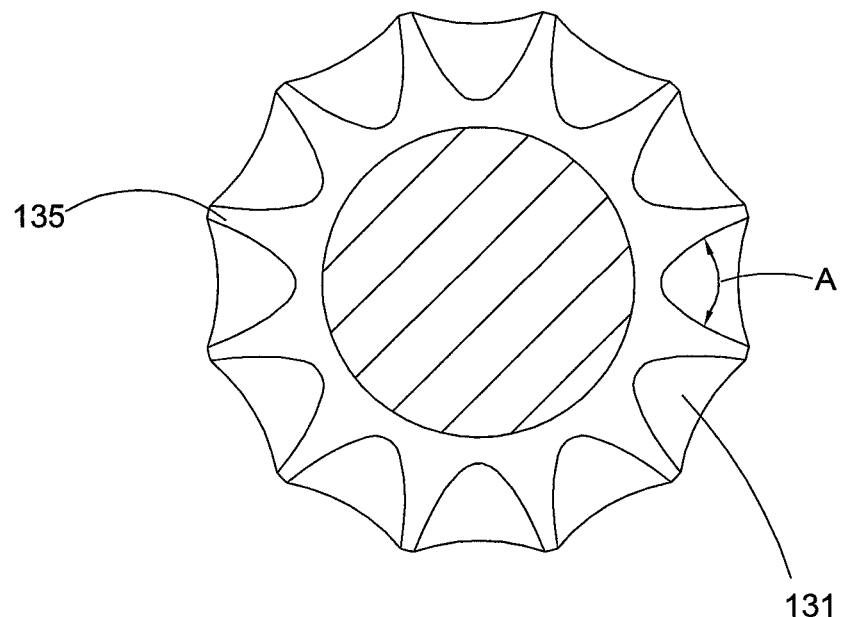
FIG. 3 is a cross-sectional view showing the conventional screw.
Figures 4, 5:
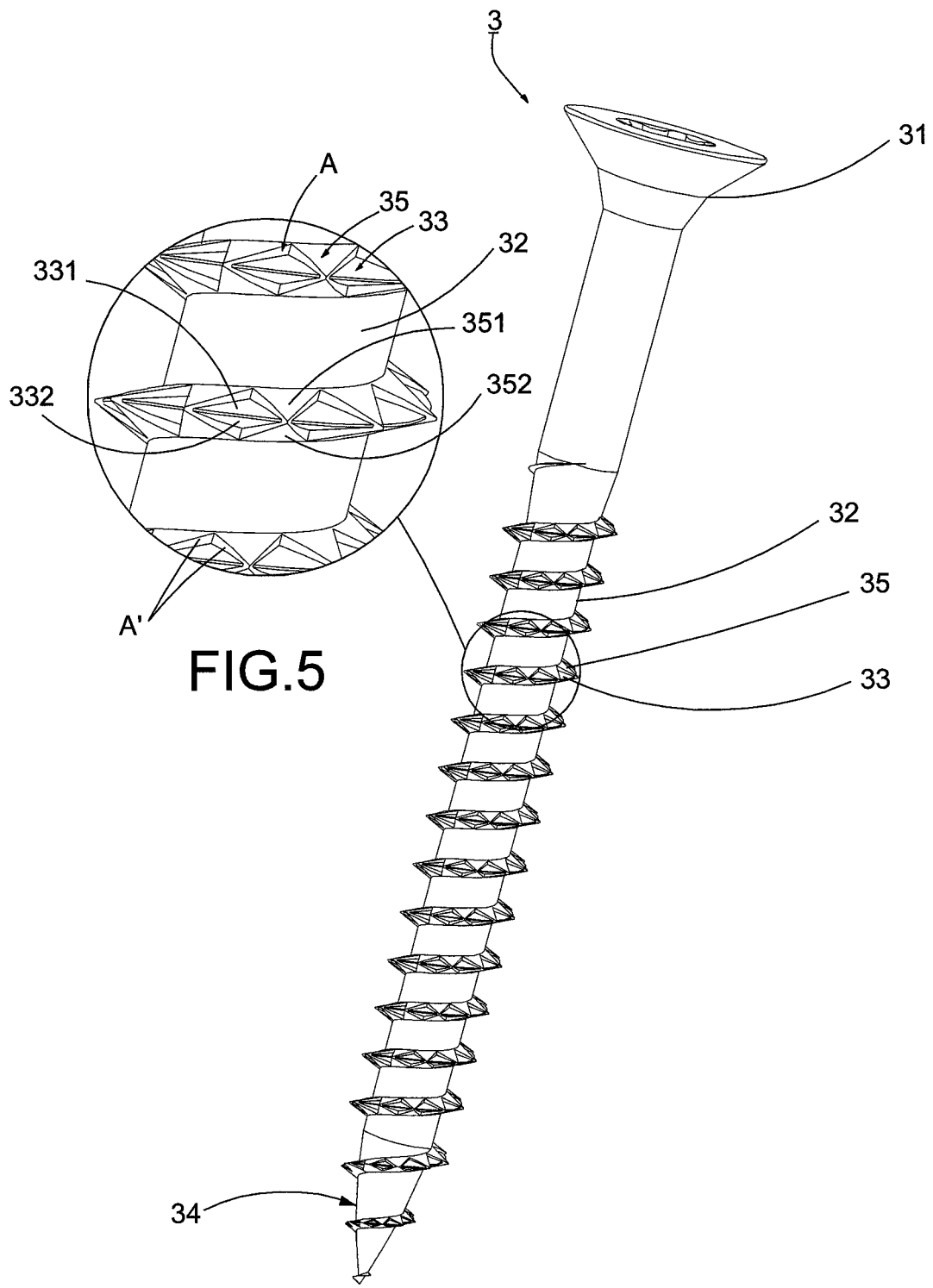
FIG. 4 is a perspective view showing the first preferred embodiment of the present invention.
FIG. 5 is a partial enlarging view showing FIG. 4.

Wherever possible, the same reference numbers are used in the drawings and the description to refer to the same or like parts.

Figure 6:
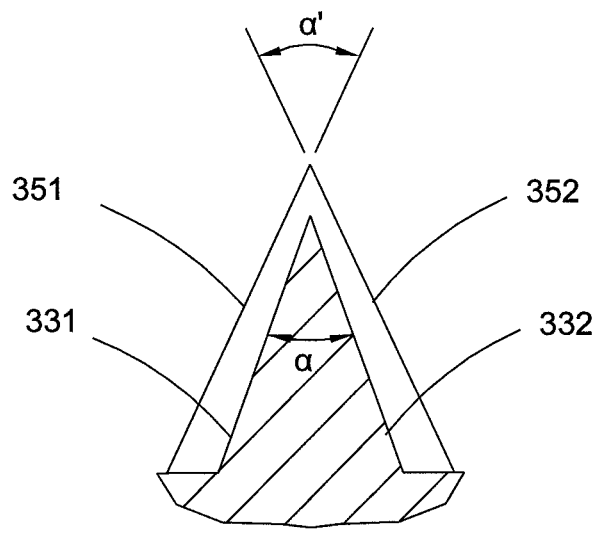
FIG. 6 is a cross-sectional view showing a thread of the first preferred embodiment.
Figure 7:
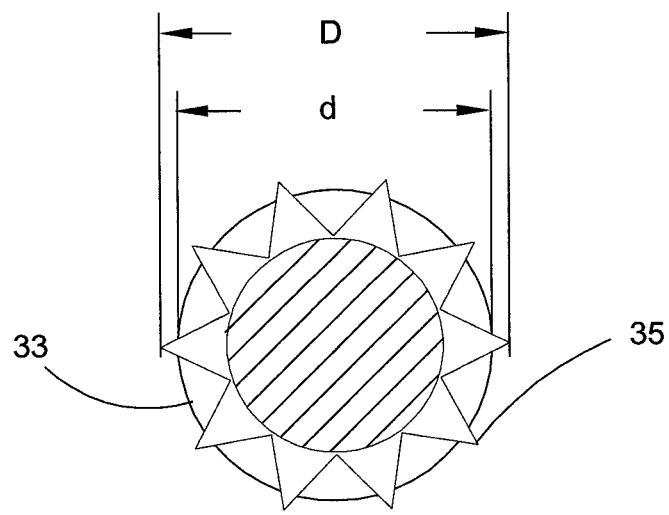
FIG. 7 is a schematic view showing the first preferred embodiment.
Figure 8:
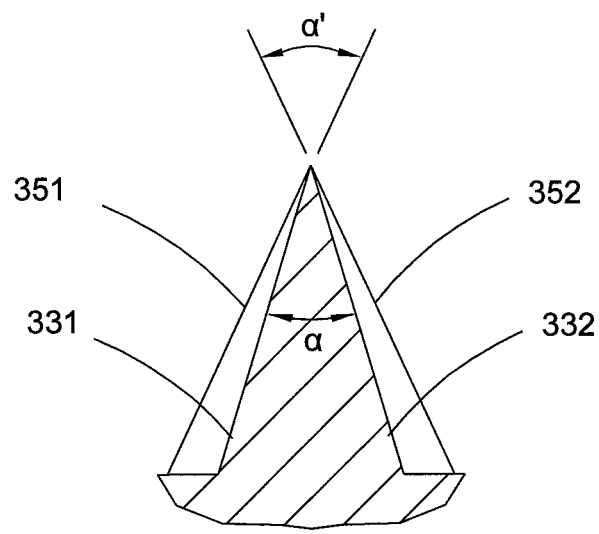
FIG. 8 is a schematic view showing a second preferred embodiment.
Figure 9:
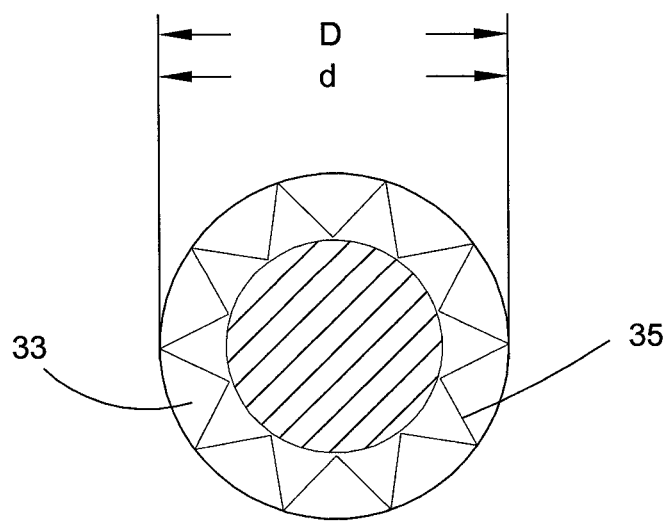
FIG. 9 is a schematic view showing the second preferred embodiment.

Referring to FIGS. 4 to 7, a first preferred embodiment of the present invention is shown. A screw 3 with low drilling resistance substantially comprises a head portion 31, a shank portion 32 extended from the head portion 31, a plurality of first threads 33 spiraling on the shank portion 32, and a drilling portion 34 disposed on the shank portion 32, opposite to the head portion 31. Wherein, each first thread 33 includes a first upper flank 331, and a first lower flank 332 connected to the first upper flank 331; a first included angle a is disposed at a convergence of the first upper flank 331 and the first lower flank 332. Characterized in that, a plurality of second threads 35 spiraling on the shank portion 32 is respectively disposed on the first upper flank 331 and the first lower flank 332. Wherein, each second thread 35 includes a second upper flank 351 and a second lower flank 352 connected to the second upper flank 351; a second included angle α' is defined at a convergence of the second upper flank 351 and the second lower flank 352. Concurrently, a plurality of opening slots A is correspondingly disposed on the second upper flank 351 and the second lower flank 352. Moreover, the first included angle α is smaller than the second included angle α'. In addition, in this embodiment, a diameter d of the first threads 33 is smaller than a diameter D of the second threads 35 (as shown in FIGS. 6 and 7), and the opening slot A is formed by at least two convergent linear flanks A'.

In operation, a screwing torque is imparted on the head portion 31 for bringing the drilling portion 34 to screw into the object (not shown). Thereby, the second threads 35 provide a severing function, and the opening slots A defined on the second threads 35 offer a drilling effect as well as a debris accommodating room for receiving the severed debris. Further, due to that the first threads 33 are disposed between the second threads 35, and the first included angle α is smaller than the second included angle α', the driving strength of the second threads 35 are hence reinforced by the firm support provided by the first threads 33, so that the drilling and cutting efficiency of the screw 3 could be preferably encouraged. Therefore, the screw of the present invention promotes the cutting efficiency for achieving a speedy fastening.

Herein, the combination of the first threads 33 and the second threads 35 provides the threads with a promoted strength, thereby enhancing the cutting efficiency. Thus, during the drilling of the screw 3, the dimension of the opening slots A does not readily influence the cutting performance. Moreover, since the diameter d of the first threads 33 is smaller than the diameter D of the second threads 35, a preferable debris accommodating room could be provided for receiving the severed debris and speedily removing the redundant debris therefrom. As a result, an aim of achieving a swift screwing is accomplished.

Referring to FIGS. 4, 5, and 8, 9, a second preferred embodiment is shown. The screw 3 with low drilling resistance substantially comprising the similar elements and correlations as those in the first preferred embodiment is herein omitted. A head portion 31, a shank portion 32, a plurality of first threads 33, a drilling portion 34, and a plurality of second threads 35 could be likely found in this embodiment. These constituents in this embodiment similarly promote the strength of the screw, enhance the cutting effect of the screw, and encourage the fastening speed of the screw as those in the first embodiment. Differently, in this embodiment, the diameter d of the first threads 33 is equal to the diameter D of the second threads 35. Accordingly, in operation, by means of the cooperation of the first threads 33 including the smaller first included angle α and the second threads 35 including the larger second included angle α', the screw 3 of the present invention is allowed to bear a larger drilling force, thereby concurrently increasing the screwing strength thereof. Moreover, since the opening slots A maintain a certain size of debris accommodating room to receive the redundant debris, the redundant debris would not stack to generate a great drilling resistance. Therefore, the object of speedy fastening is achieved.

Figure 10:
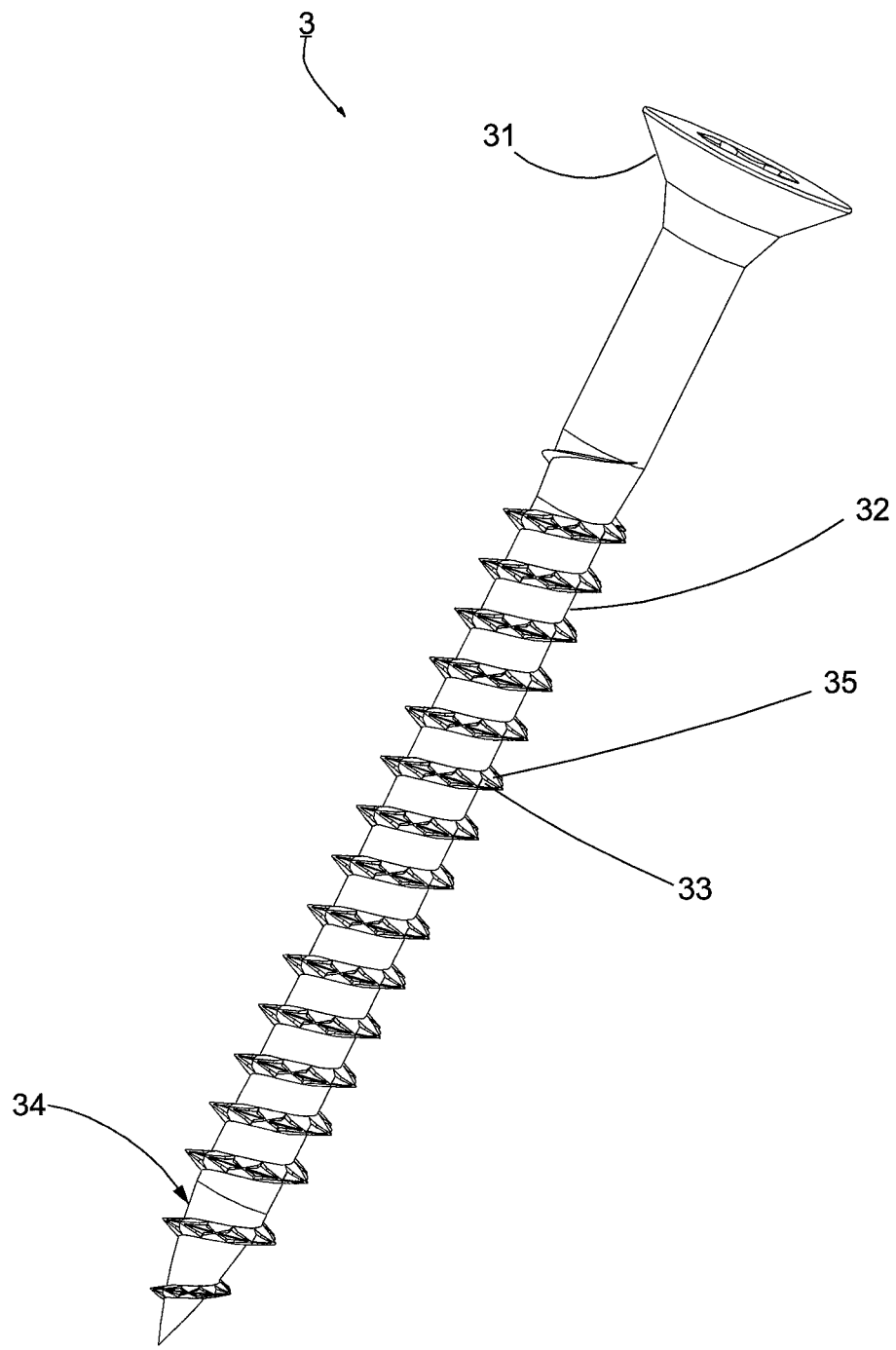
FIG. 10 is perspective view showing a third preferred embodiment.
Figure 11:
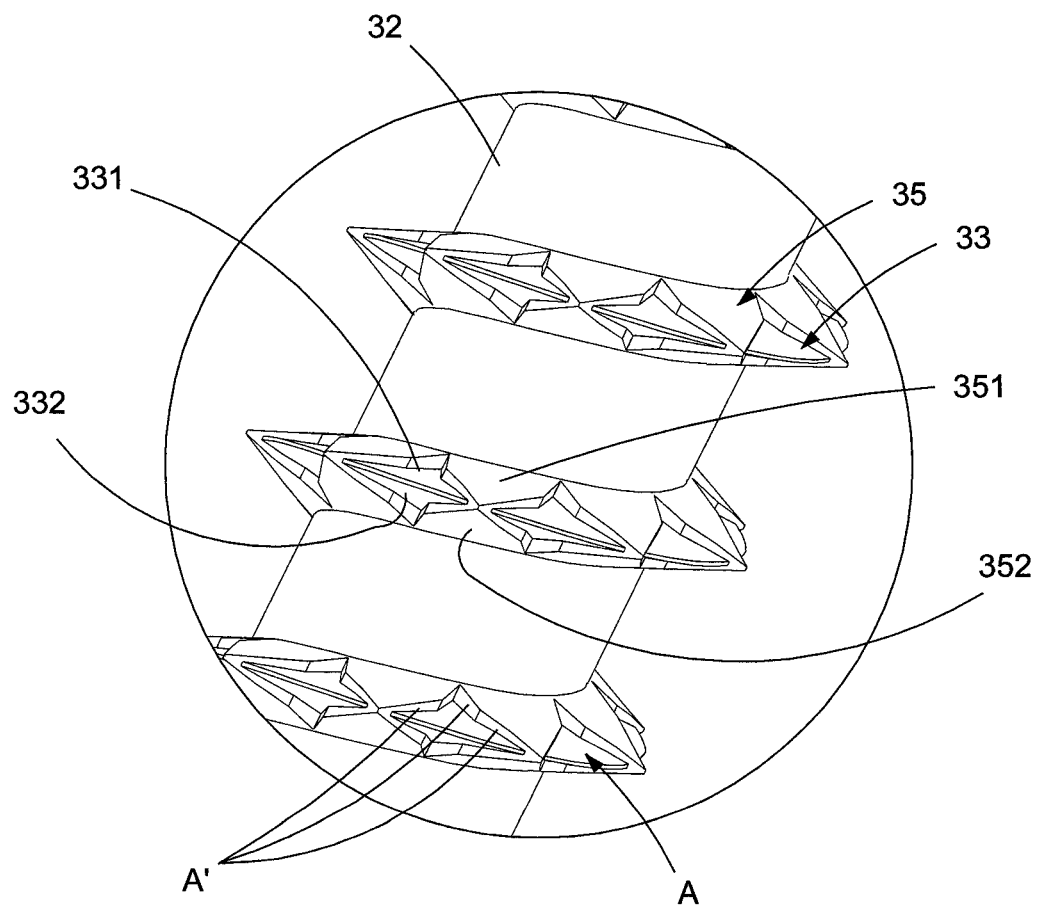
FIG. 11 is a partial enlarging view showing FIG. 10.

Further referring to FIGS. 10 and 11, a third preferred embodiment is shown. The screw 3 of the present invention comprising the similar elements and correlations as those in the first preferred embodiment is herein omitted. A head portion 31, a shank portion 32, a plurality of first threads 33, a drilling portion 34, and a plurality of second threads 35 could be likely found in this embodiment. These constituents in this embodiment similarly promote the strength of the screw, enhance the cutting effect of the screw, and encourage the fastening speed of the screw as those in the first embodiment. Differently, the opening slots A defined on the second threads 35 are correspondingly formed by multiple convergent linear flanks A'. In operation, the cooperation of the first threads 33 and the second threads 33 offers a preferable drilling strength, and the opening slots A maintain a room in a certain size for the debris accommodation so as to decrease the drilling resistance and promote the cutting effect. Therefore, a prompt drilling performance could be arrived.

To sum up, the present invention in particularly utilizes a plurality of opening slots correspondingly defined on the second threads not only to reserve a debris accommodating room but to assist in severing object fibers. In addition to the bearing force of the second threads is reinforced by the first included angle being smaller than the second included angle, the cutting performance of the screw in accordance with the present invention is preferably promoted, and a speedy fastening effect is accomplished.

While we have shown and described the embodiment in accordance with the present invention, it should be clear to those skilled in the art that further embodiments may be made without departing from the scope of the present invention.

I claim:

1. A screw with low drilling resistance, comprising:
   a head:
   a shank extended from said head;
   a plurality of first threads spiraling on said shank;
   a drilling portion disposed on said shank opposite to said head; wherein each first thread includes a first upper flank and a first lower flank connected to said first upper flank; said first upper flank and said first lower flank extending radially from said shank to converge at a first included angle;
   a plurality of second threads being affixed to said threads and spiraled on said shank and being respectively disposed on said first upper flank and said first lower flank of said first threads; each second thread including a second upper flank and a second lower flank connected to the second upper flank;
   a plurality of connective opening slots being defined by said plurality of second threads, said plurality of connective opening slots exposing portions of said first threads therethrough, said second upper flank and said second lower flank extending radially from said shank to converge at a second included angle, and said first included angle of said first thread being less than said second included angle of said second thread; and
   said first upper flank, said first lower flank, said second upper flank and said second lower flank converging to a singular apex point;
   whereby said difference in said first and second included angles provide an increased volume within each of said plurality of connective opening slots for receiving debris.

* * * * *